(12) United States Patent
Crawford

(10) Patent No.: US 11,878,879 B1
(45) Date of Patent: Jan. 23, 2024

(54) DRY GRANULAR MATERIAL TRANSFER

(71) Applicant: Daniel E. Crawford, Mandeville, LA (US)

(72) Inventor: Daniel E. Crawford, Mandeville, LA (US)

( * ) Notice: Subject to any disclaimer, the term of this patent is extended or adjusted under 35 U.S.C. 154(b) by 0 days.

(21) Appl. No.: 17/975,040

(22) Filed: Oct. 27, 2022

(51) Int. Cl.
| | |
|---|---|
| *B65G 53/44* | (2006.01) |
| *B65G 53/12* | (2006.01) |
| *B65G 53/50* | (2006.01) |
| *B65G 53/66* | (2006.01) |
| *B65G 53/46* | (2006.01) |

(52) U.S. Cl.
CPC ......... *B65G 53/12* (2013.01); *B65G 53/4616* (2013.01); *B65G 53/50* (2013.01); *B65G 53/66* (2013.01); *B65G 2814/0347* (2013.01)

(58) Field of Classification Search
None
See application file for complete search history.

(56) References Cited

U.S. PATENT DOCUMENTS

| | | | | |
|---|---|---|---|---|
| 1,349,948 A * | 8/1920 | Echterling | ............. | B65G 53/00 406/68 |
| 1,591,378 A | 7/1926 | Hansen | | |
| 2,791,339 A * | 5/1957 | Sprague | ................ | A01D 90/10 198/570 |
| 2,988,402 A * | 6/1961 | Policansky | ............ | A24C 5/478 406/79 |
| 4,189,259 A * | 2/1980 | King | .................. | B65G 53/4616 406/31 |
| 4,850,749 A * | 7/1989 | Sweeney | ................ | B65G 53/44 414/217 |
| 5,049,007 A * | 9/1991 | Abel | ...................... | A24C 5/392 406/52 |
| 5,147,156 A | 9/1992 | Guettler et al. | | |
| 5,556,237 A * | 9/1996 | Rexius | ...................... | B60P 1/60 406/48 |
| 5,795,108 A | 8/1998 | Lightle | | |
| 6,089,795 A | 7/2000 | Booth | | |
| 6,290,150 B1 * | 9/2001 | Jones | ..................... | A01C 15/04 239/654 |
| 6,357,971 B1 * | 3/2002 | Rexius | ...................... | B60P 1/60 406/48 |

(Continued)

FOREIGN PATENT DOCUMENTS

CH 343809 A * 2/1960

*Primary Examiner* — Joseph A Dillon, Jr.
(74) *Attorney, Agent, or Firm* — KEATY LAW FIRM LLC; Thomas S. Keaty

(57) ABSTRACT

A dry granular material transfer system and method for transfer of granular material such as sand in a dry state through a hose using pressurized air. On a base platform, a conveyor subsystem moves granular material placed on a lower portion to a higher portion while separating clumped material and allowing rocks and debris to fall away, spreading the granular material in a thin layer for ejection at the highest level. A containment subsystem receives granular material and contains the downward fall of material. A portioning subsystem has a turntable with blow-through chambers which receive granular material and move into line with an air inflow tube and air-material outflow tube, and the air-material mixture is blown through the air-material outflow tube and through a transfer hose.

19 Claims, 10 Drawing Sheets

(56) References Cited

U.S. PATENT DOCUMENTS

| | | | |
|---|---|---|---|
| 6,491,480 B2* | 12/2002 | Waddell | B65G 19/14 406/81 |
| 7,094,004 B2 | 8/2006 | Dunlop et al. | |
| 7,125,204 B2* | 10/2006 | Wysong | B60P 1/60 406/146 |
| 7,275,893 B2 | 10/2007 | Rexius et al. | |
| 7,520,935 B2* | 4/2009 | Fellinger | E04F 21/085 118/308 |
| 8,100,220 B2* | 1/2012 | Rexius | B62D 5/06 701/41 |
| 8,562,248 B2 | 10/2013 | Kleiger | |
| 11,407,599 B2* | 8/2022 | Reich | B61K 11/00 |
| 2017/0015231 A1* | 1/2017 | Moran | B60P 1/36 |
| 2021/0070557 A1 | 3/2021 | Nolen | |

* cited by examiner

DRY GRANULAR MATERIAL TRANSFER

BACKGROUND OF THE INVENTION

This invention provides a dry granular material transfer system and method for transfer of granular material such as sand in a dry state through a hose using pressurized air.

There is a need to transfer and distribute granular material such as sand from large containers such as a dump truck to cover large areas as a relatively thin layer of several inches thickness. Sand, or similar granular materials such as wood chips or dust, glass or slag beads, nut shells, or various granular desiccants can be used to build up the profile of an area of ground, to build or maintain a beach, breakwater, or berm, or to absorb pollutants or otherwise remediate environmental damage.

There are disadvantages to transferring and distributing sand as a wet slurry. A very large supply of water is required to do so, and the water might not be available in many circumstances. Sand applied as a slurry requires time to drain and dry, and the covering of sand develops a crusted surface after drying. When sand is intended to improve drainage, the introduction of a large amount of water is not helpful. When sand is intended to absorb water or other substances, the water in a slurry is counterproductive.

Sand is often used in a slurry to allow pumping with available standard pumps. The pumping of sand in a dry state is difficult or impossible with available standard pumps for several reasons. Dry sand is abrasive and will quickly wear the impellers, vanes, and other parts of many standard pumps. Any part of a pump which mechanically pushes dry sand is subject to excessive wear. Pumps are not able to effectively draw dry sand in under a vacuum.

At a typical work site, sand is often delivered in a 15-cubic-yard quantity in a dump truck. The dump truck might be available to stay for the duration of the sand-spreading operation or might have to unload and leave. Due to transport and storage conditions, the sand might be very dry, very wet, or at a desirable slightly moist but still substantially dry state.

Transfer and distribution of sand can occur under difficult and challenging conditions. The operation might occur at a remote work site with no access to water, sewer, electric, or other services. The operation usually requires the manipulation of a large hose. The operation might require entering and moving around in limited spaces such as crawl spaces under a building. The absence of a controlled, steady, reliable supply of substantially dry sand makes these operations even more difficult and challenging.

What is needed is a dry granular material transfer system and method for transfer of granular material such as sand in a dry state through a hose.

U.S. Pat. No. 7,094,004 for an "Apparatus and Method for Moving and Placing Granulate Material," issued on Aug. 22, 2006 to assignee Air Pump Industries, provides for a method and system for moving and placing, in hard-to-reach locations, granular and other particulate material such as sand, gravel, earth, and similar materials. The system includes an improved auger for moving the material and an improved rotary airlock mechanism designed to withstand the abrasive action of the particulate material and, at the same time, move the material several hundred feet through a flexible conduit for placement in a pre-designated location. A system and apparatus are also provided for transporting, on one vehicle, all of the devices needed at a remote site for operation of the particulate placement system, including a front loader.

U.S. Pat. No. 7,275,893 for "Apparatuses and Methods for Dispensing Materials," issued on Oct. 2, 2007 to assignee Finn Corporation, provides for apparatuses and methods for the disbursement of relatively heavy materials, such as aggregate or wet compost, out of a moveable container. Material is conveyed within the container to a feeder that meters the material into an air stream. The air stream is provided at a relatively high pressure and flowrate with respect to other mobile blowing systems. The air stream carries the material though a hose that is manned by an operator. The operator points the hose towards a desired location for application of the dispersed material.

U.S. Pat. No. 5,147,156 for "Golf Course Construction and Maintenance Methods," issued on Sep. 15, 1992 to assignee Sandscape Inc., provides for a method for the placement of sand, gravel, or equivalent particulate material onto a sand trap, tee, putting green, or other selected area of a golf course for construction or maintenance purposes. Sand or other particulate material is pneumatically transported through a flexible conduit from an off-load site remote to the selected area to a nozzle positioned at the selected area and is sprayed from the nozzle onto the selected area. The method eliminates the labor-intensive prior method of wheelbarrowing sand or gravel from the off-load site to the selected site and the need then to rake or hoe the sand or gravel to properly spread it about the selected area.

US Publication No. 2021/0070557 for a "Rotary Airlock Device and System for Moving and Placing Granulate Material," published on Mar. 11, 2021 by inventor Michael Nolen, discloses a system for moving and placing granulate. A housing is mountable to a trailer and has at least one cabinet located on a side of the housing with a compressor, at least one back compartment located on a back side of the housing, wherein the at least one back compartment has at least one rotary airlock device in communication with the compressor, wherein the compressor feeds air to the rotary airlock device under pressure, an actuatable feeder located on the back side of the housing, wherein the feeder when in an open position receives granulate and feeds the granulate to the at least one rotary airlock device, and a hose mount located on the housing and in communication with a bottom portion of the at least one rotary airlock, wherein when the compressor is actuated, the granulate is fed from the feeder, through the at least one rotary airlock and out through the house mount into a hose to place the granulate in a predetermined place.

U.S. Pat. No. 5,795,108 for a "Method of Moving and Placing Granular Materials," issued on Aug. 18, 1998 to inventor Roger G. Lightle, provides for a method of placing granular materials, such as sand, on a golf course or the like, and the method includes loading granular materials into a hopper for feeding a sand gun, directing the granular materials from the hopper into the sand gun, and directing compressed air into the sand gun and into an elongated flexible hose to thereby direct the granular materials into the sand gun through the flexible hose. The sand gun also includes the step of spinning the granular materials therein. The granular materials passing through the flexible hose are directed through an exit nozzle and water may be injected from a water source through the exit nozzle and into the granular materials whereby granular materials and water from remote locations are distributed through a flexible hose onto a predetermined site by aiming the nozzle.

U.S. Pat. No. 1,591,378 for a "Pneumatic Conveyer for Molding Sand," issued on Jul. 6, 1926 to assignee Ingersoll-Rand Company, provides for a portable device to be used in foundries or construction work for pneumatically and uniformly feeding, screening, mixing, and projecting materials, such as sand or cement not in suspension in liquid, into the path of a compressed air stream adapted to blow it on the work in a predetermined quantity and at a predetermined speed. The device is powered by a supply of compressed air.

U.S. Pat. No. 6,089,795 for a "Mobile Apparatus for Pneumatic Conveyance of Gravel or Similar Granular Material," issued on Jul. 18, 2000 to inventor Larry Booth, provides for an apparatus for pneumatically conveying granular material such as gravel. The apparatus includes a vehicle base mounting plate, a prime mover, such as a diesel engine, a hydraulically driven air blower, a hopper for receiving gravel to be conveyed, and a hydraulically driven auger assembly for moving gravel from the hopper to a pneumatic pick-up point. After pneumatic pickup, the gravel is transported through an extended network of suitable pneumatic tubing such as low friction, thick wall, PVC pipe sections, to a desired discharge location, where the material is discharged into a catch can for downward placement at a desired point. In a preferred embodiment, the auger assembly comprises a three-piece unit, with a shaft, an inner auger section, and an outer auger section. The outer auger section is a replaceable wear part which can be repaired, rebuilt, or replaced as necessary due to frictional wear on the auger due to contact with the solid being conveyed. In an alternate configuration, a vertically oriented auger is provided to directly feed material to be conveyed into a pneumatic uptake tube. Preferably, the pneumatic uptake tube is manually reversable so that material can be discharged out either side of the vehicle, to enable the equipment to conveniently be deployed in narrow streets or other restricted work sites.

U.S. Pat. No. 8,562,248 for a "Method and Apparatus for Repairing Potholes and the Like," issued on Oct. 22, 2013 to assignee Patch Management, Inc., provides for a vehicle mounted patching system for patching potholes, and the like, incorporating a method and apparatus for feeding materials used in patching operations as well as removing and flushing asphalt emulsion from the feed lines of the patcher vehicle to completely recycle the cleaning agent used to flush the feed lines after a patching operation, as well as preventing any external discharge of potentially toxic materials. Dry particulate is used to coat a pothole patch to permit immediate use. Rubber particulate impregnated with a fibrous material is used to assure bonding with the emulsion. A hydraulically-driven feeder feeds particulate into a pressurized conduit through a one-way air lock. A hydraulic pump provides mechanical power to the feeder and an air blower which pressurizes the conduit carrying the particulate to a dispensing head. A spray assembly is provided to spray fibrous material entering the feeder.

SUMMARY OF THE INVENTION

This invention provides a dry granular material transfer system and method for transfer of granular material such as sand in a dry state through a hose using pressurized air.

On a base platform, a conveyor subsystem moves granular material placed on a lower portion to a higher portion while separating clumped material and allowing rocks and debris to fall away, spreading the granular material in a thin layer for ejection at the highest level. A containment subsystem receives granular material and contains the downward fall of material. A portioning subsystem has a turntable with blow-through chambers which receive granular material and move into line with an air inflow tube and air-material outflow tube, and the air-material mixture is blown through the air-material outflow tube and through a transfer hose.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
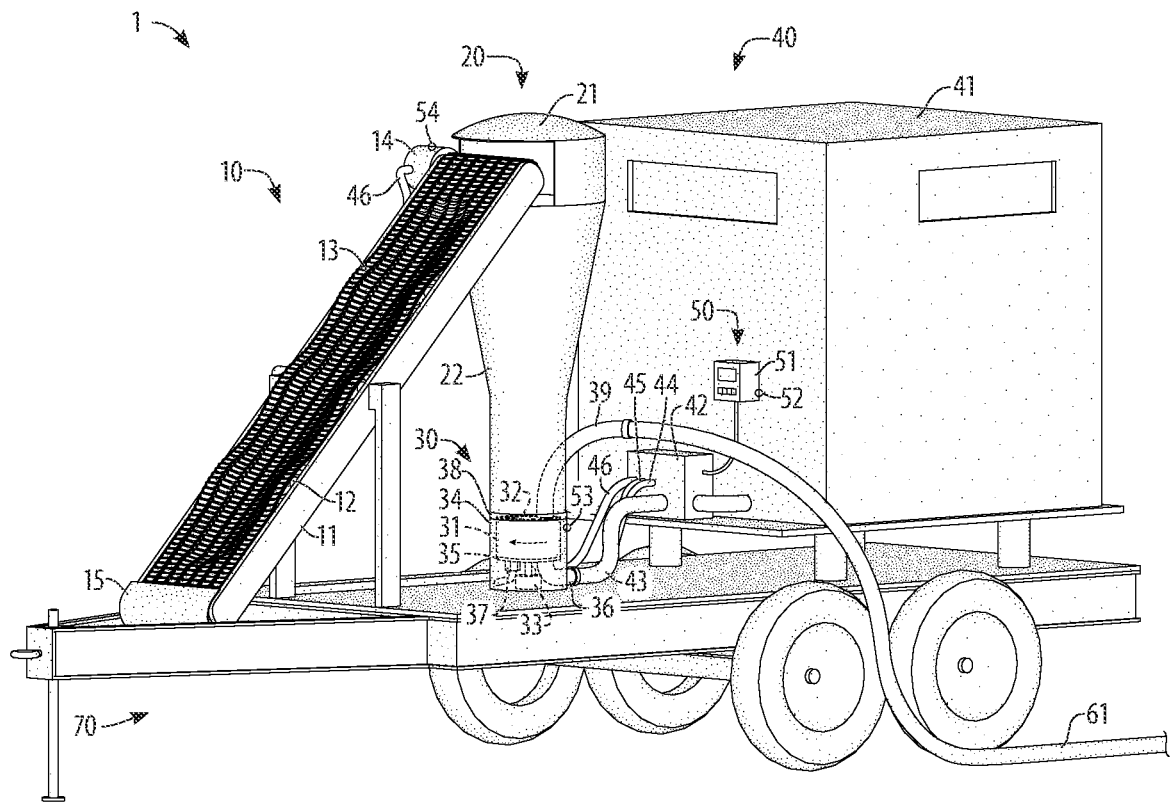
FIG. 1 is a perspective view of the dry granular material transfer system of the invention.

Referring to FIG. 1, the dry granular material transfer system and method 1 provides transfer of granular materials such as sand, in a dry state, through a hose 61, using pressurized air. The term "sand" is used in a broad sense to encompass granular material composed of finely divided rock and mineral particles of various compositions plus sand-like materials having similar properties and similar requirements for handling and transfer and distribution through a hose in a dry state, such as wood chips or dust, glass beads, slag beads, nut shells, or granular desiccants. The term "dry" is used to mean substantially dry, and not a slurry, because a small amount, such as the moisture in the ambient air, is not detrimental. A typical use for sand, for which the preferred embodiment illustrated herein is appropriate, is the transfer and distribution of sand, performed at various different work sites, for covering ground including ground underneath structures for the purpose of modifying the drainage, profile, or other characteristics of the ground, for creating or maintaining beaches, breakwaters, berms, or similar structures, and for environmental remediation using sand to absorb, filter, or prevent the movement of deleterious substances.

In use, the sand is transferred and distributed, in a substantially dry state, through the hose 61. The illustrated preferred embodiment of the dry granular material transfer system 1 is intended to be transportable to a work site such as a residential or commercial property, and is intended to transfer and distribute sand through a two-inch hose of approximately 100' to 150' length, with the end of the hose being moved about over the ground surface to fill low spots and create a more even top surface. This preferred embodiment transfers and distributes approximately 15 cubic yards of sand in approximately one hour, to cover, for example, 1215 square feet of ground to an average depth of 3 inches of sand.

The dry granular material transfer system 1 provides a base platform 70 upon which the system is mounted. The base platform 70 can be a trailer, as illustrated, which allows the system to be easily moved to various locations to perform, for example, distribution of sand underneath a residential structure, or for remediation at a remote location. In circumstances where the dry granular material transfer system is only to be used fixed in one place, a stationary base platform 70 would be appropriate. For use on the water, the base platform 70 can be a barge or vessel, and for use in marshy or swampy environments, the base platform can be an amphibious vehicle.

The dry granular material transfer system 1 provides subsystems which are treated in detail below. A conveyor subsystem 10 conveys sand into the system at a controlled rate, separates clumps of sand, rejects rocks and foreign objects, and exposes a thin layer of sand allowing equilibration with the ambient air. A containment subsystem 20 contains sand spilling from the top of the conveyor subsystem 10 and allows further equilibration of the sand while falling downward. A portioning subsystem 30 separates the sand into a series of discrete portions and aligns the portions of sand material for output from the system as an air-material mixture. An air subsystem 40 provides and distributes air under pressure for operation of the system. A control subsystem 50 provides for control and regulation of the system.

The base platform 70 holds the conveyor subsystem 10, containment subsystem 20, and portioning subsystem 30 in fixed positions relative to each other. Portions of the air subsystem 40 or the control subsystem 50 can also be mounted upon the base platform 70 for convenience of handling the whole system as a unit, as shown in the illustrated embodiment, or can be used in close proximity to the base platform 70 and connected to the other subsystems using removable connectors.

The air subsystem 40 provides an air pressure supplier 41, which can be a commercially available air compressor of sufficient capacity or can be some other source of compressed air. With the exception of some components of the control subsystem which can use low-voltage electrical power such as from a battery or a small generator, the rest of the dry granular material transfer system 1 operates on pneumatic compressed air supplied by the air pressure supplier 41. Therefore, the power-input requirements of the air pressure supplier 41 are substantially the power-input requirements of the whole dry granular material transfer system 1 in use on a work site. If, for example, a diesel-powered air compressor is used, then diesel fuel will be the source of power required at the work site, and no high-voltage electric power will be needed. An air pressure supplier 41 capable of providing 480 cubic feet per minute at 120 pounds per square inch is appropriate. Such diesel-powered air compressors are available for purchase or for lease. Such a purchased or leased air compressor could be used to supply the dry granular material transfer system 1 on an as-needed basis.

The air pressure distributor 42 distributes the flow of compressed air from the air pressure supplier 41. A very large flow of air is supplied through an inflow air supply 43 to the partitioning subsystem as treated below. In a preferred embodiment using pneumatic air motors, smaller flows of air are supplied through a turning-motor supply 44, vibrator-motor supply 45, and conveyor-motor supply 46, as treated below.

The control subsystem 50 provides a controller unit 51 which provides for activation, deactivation, and operation of the dry granular material transfer system 1 as treated below.

Figure 2:
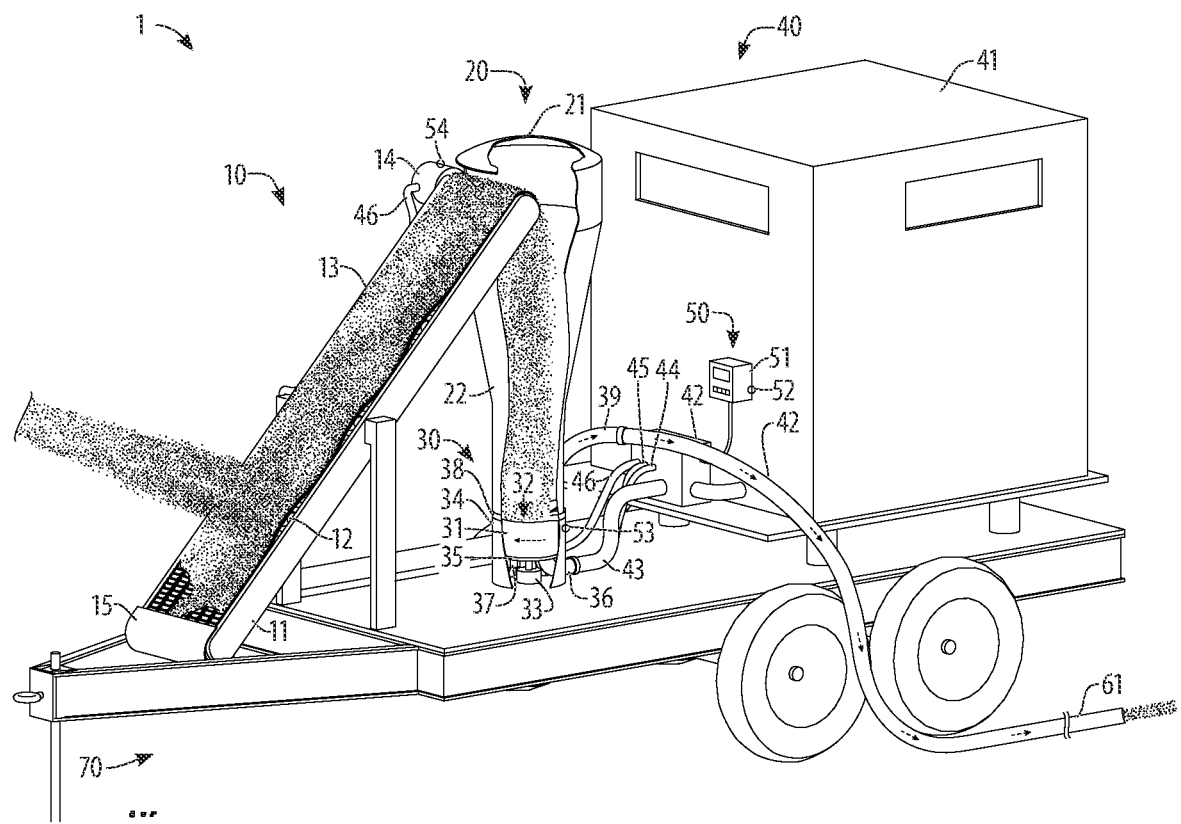
FIG. 2 is a partial cutaway view of the dry granular material transfer system of the invention in use.

Use of the dry granular material transfer system 1 is illustrated in FIG. 2. Sand is supplied from an appropriate source and is placed on the lower portion of the conveyor subsystem 10. Typically, the sand will be delivered to the work site in a dump truck. Sand can be transferred directly from the dump truck if the dump truck remains available through the completion of the work operation. Otherwise, the sand can be dumped into an intermediate holding container or onto the ground. The sand can be placed on the lower portion of the conveyor subsystem 10 by pouring, by moving the sand on a tray or other external conveyor, or can be shoveled either manually or with machinery such as a bulldozer or backhoe. Sand is fed to the dry granular material transfer system 1 at substantially the same rate at which the sand is transferred out through the system. A moderate amount of sand can be held in the containment subsystem 20, which can buffer small lapses in the supply of sand. The system will not be harmed by operating without sand. If too much sand is supplied too quickly, excess sand will spill off of the conveyor subsystem 10 and will pile on the ground.

The condition of the sand being supplied to the dry granular material transfer system 1 might be too wet or too dry as a result of transport or storage conditions. The conveyor subsystem 10 and containment subsystem 20 cause wet clumps of sand to be separated, and cause the sand to be spread in a thin layer and to fall loosely, allowing for drying of sand that contains more moisture than the ambient air, and for moistening of sand that is drier than the ambient air. If the supplied sand is extremely wet or extremely dry, external equipment such as a forced-air heater or a spraying or misting unit can be used. If the dry granular material transfer system 1 is used in heavy rain, the conveyor subsystem 10 should be covered. If the pressurized air from the air pressure supplier 41 is too wet or too dry, that air can be conditioned as needed.

The conveyor subsystem 10 treated in detail below provides a conveyor frame 11 with conveyor belt 13 mounted upon the base platform 70 at an angle. The angle should be sufficiently steep to cause excess sand and clumped sand to slide downward to evenly distribute the sand, and cause objects such as rocks to slide downward and fall off the end of the conveyor belt 13, as shown. The containment subsystem 20 provides a contained area and path for sand to fall from the top of the conveyor subsystem 10 toward the portioning subsystem 30. The portioning subsystem 30 treated in detail below provides a turntable 31 having a series of blow-through chambers 32 each of which becomes filled with sand and is rotated into alignment with an air inflow tube 36 and an air-material outflow tube 39. High-pressure air from the air pressure supplier 41 and air pressure distributor 42 through the inflow air supply 43 and inflow tube 36 blows the portion of sand in the blow-through chamber 32 through the air-material outflow tube 39 and through the transfer hose 61, in a continuous process.

Figure 3:
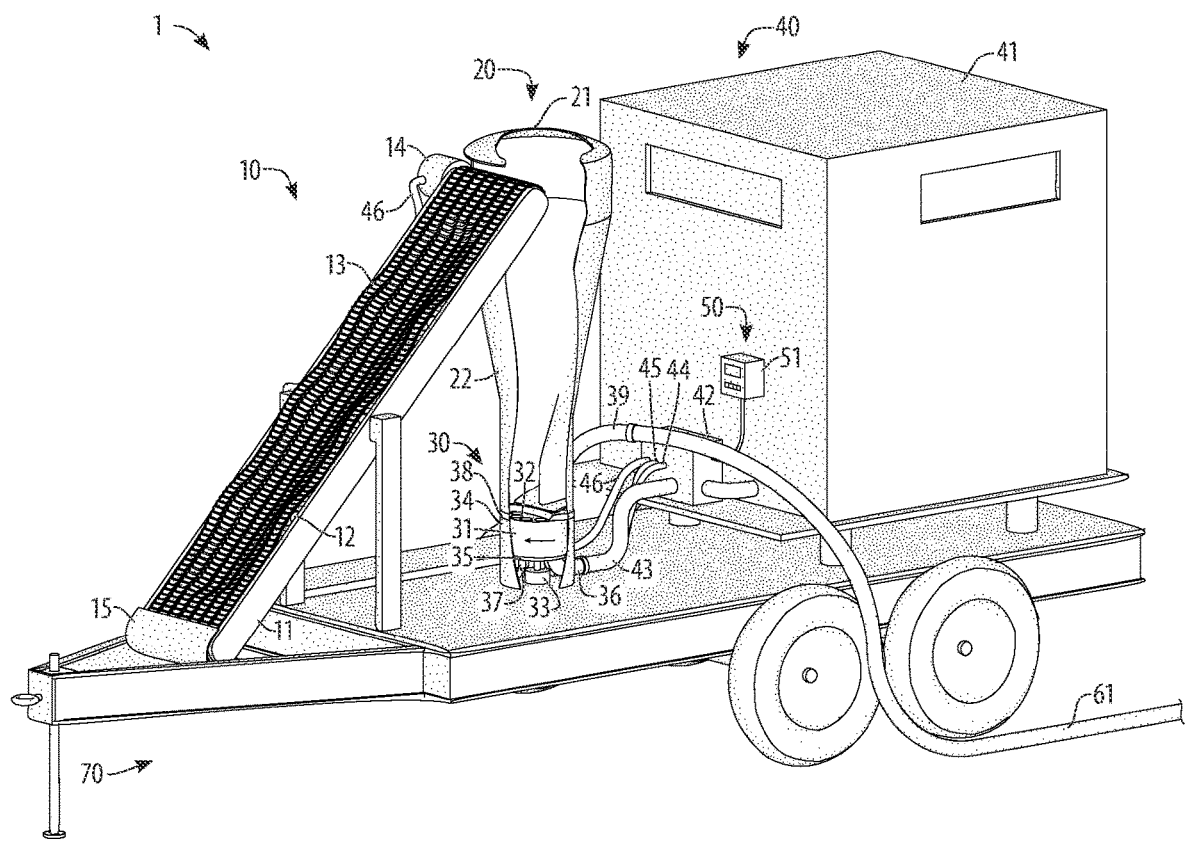
FIG. 3 is a partial cutaway view of the dry granular material transfer system of the invention.

Referring to FIG. 3, The containment subsystem 20 provides a containment cover 21 having an opening to receive sand falling from the top of the conveyor belt 13 while preventing the sand from being blown away by wind.

A containment funnel 22 allows sand to fall freely while being guided into position to enter the portioning subsystem 30.

Figure 4:
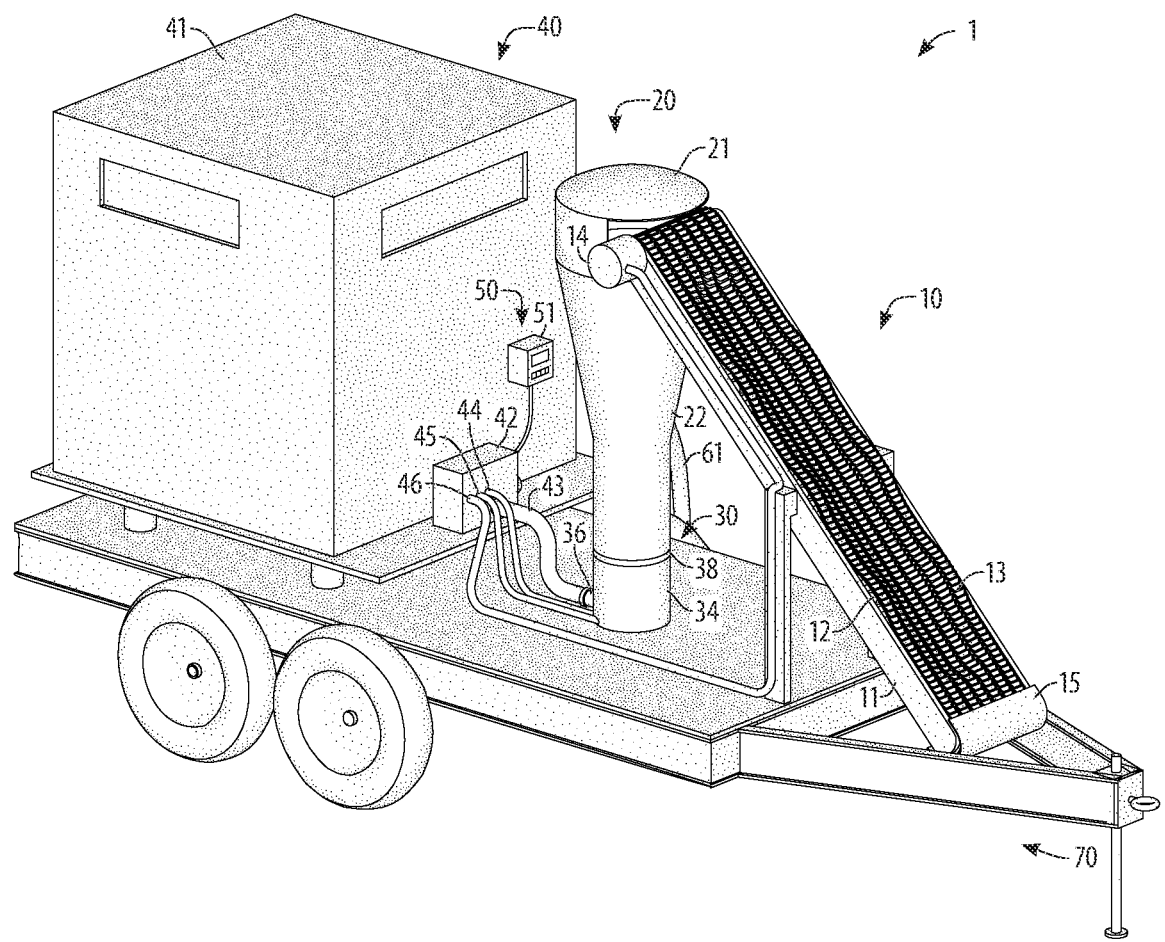
FIG. 4 is another perspective view of the dry granular material transfer of the invention.
Figure 5:
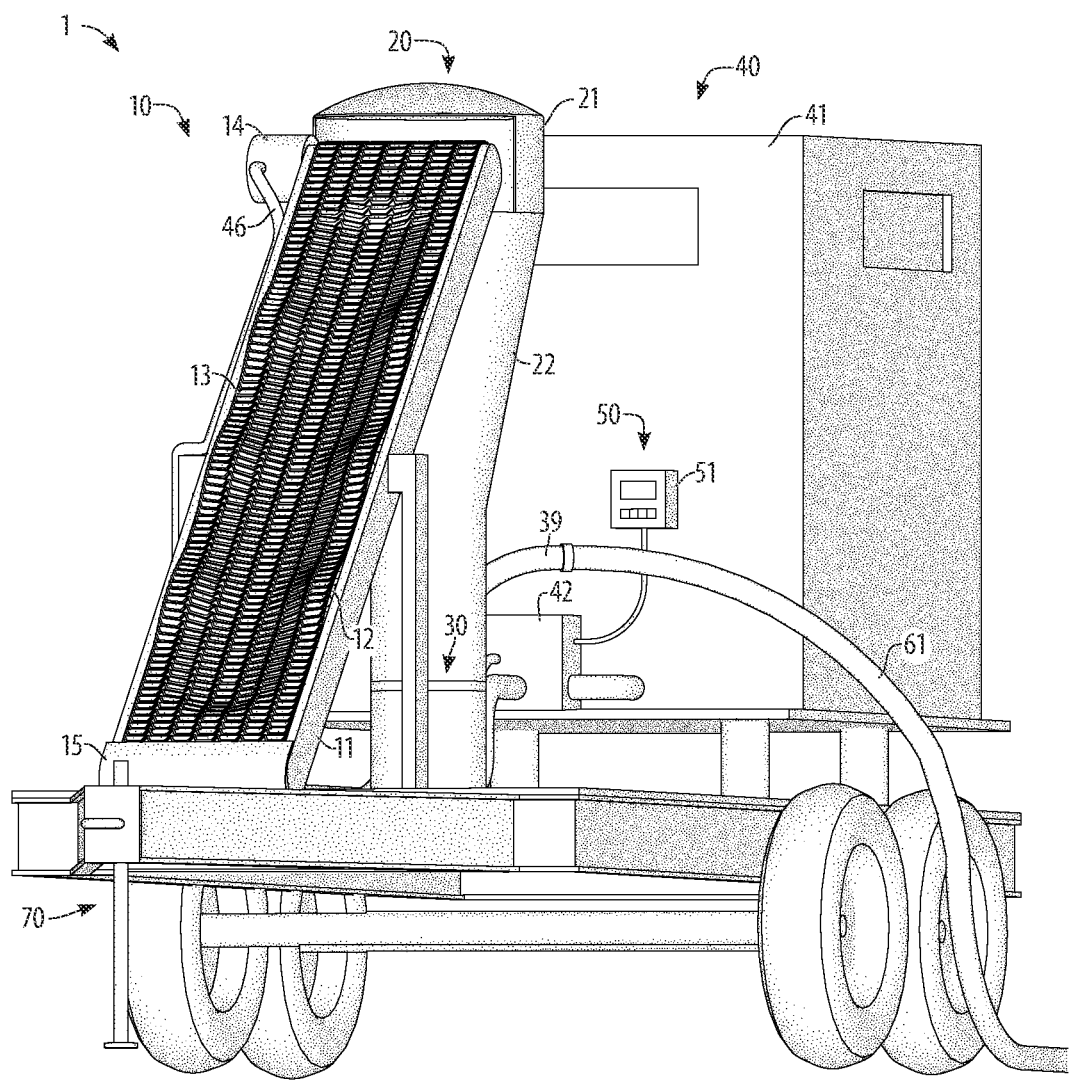
FIG. 5 is a front perspective view of the dry granular material transfer of the invention.

Referring to FIG. 4 and FIG. 5, the conveyor subsystem 10 provides a conveyor frame 11 mounted upon the base platform 70 at an angle. The angle should be sufficiently steep to cause excess sand, clumped sand, and objects such as rocks to slide downward. The illustrated embodiment uses an angle of 45 degrees from horizontal and vertical. A conveyor belt 13 is mounted upon the conveyor frame 11, and is operated by a conveyor motor 14. The conveyor motor 14 in a preferred embodiment is a pneumatic air motor which is supplied with pressurized air through a conveyor-motor supply 46. Conveyor rollers 12 set at angles to the plane of the conveyor belt 13 support the conveyor belt and cause a raising and lowering of the outer edges of the conveyor belt in relation the central portion. The edges of the conveyor belt 13 are raised and lowered in a wave pattern, causing changes to the profile of the segments of the belt along the belt which enhance the tendency of excess sand, clumped sand, and rocks to slide downward. Rocks, clumps of sand which will not break up, and other foreign objects will tumble all the way down the conveyor belt 13 and will fall to the ground or into a suitable container. Optionally, a conveyor lower cover 15 can be provided to capture grains of sand which fall to the lower end so that those grains might be captured by empty wells turning around the lower end.

Figure 6:
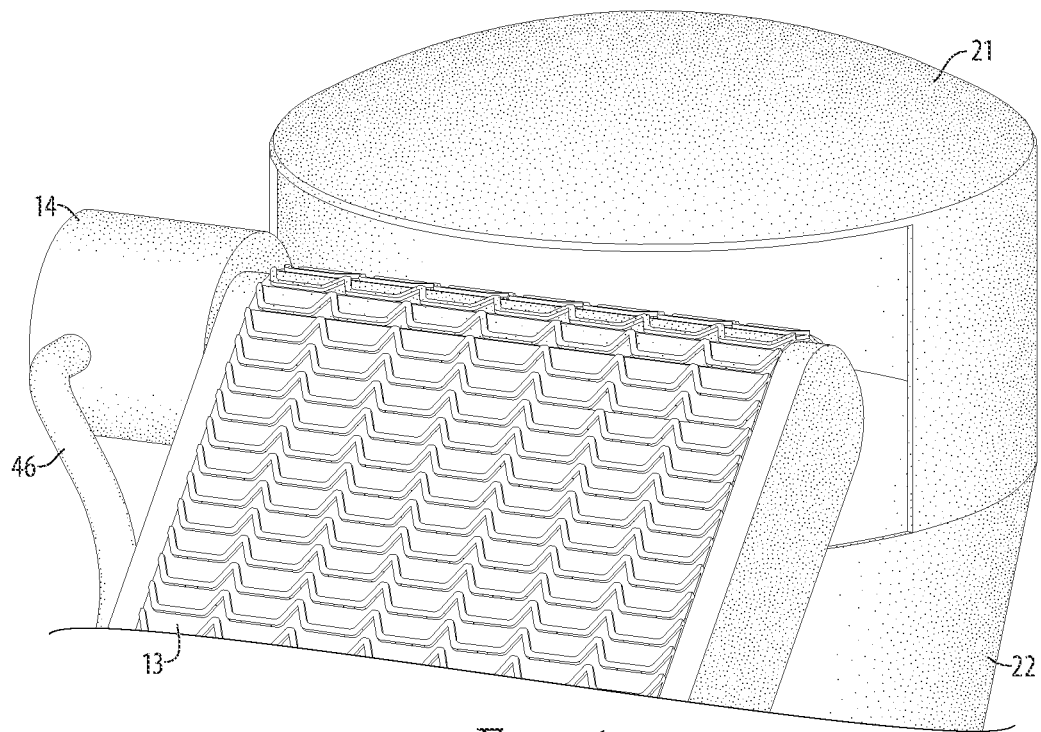
FIG. 6 is a detail view of the top of the conveyor subsystem of the dry granular material transfer system of the invention.
Figure 7:
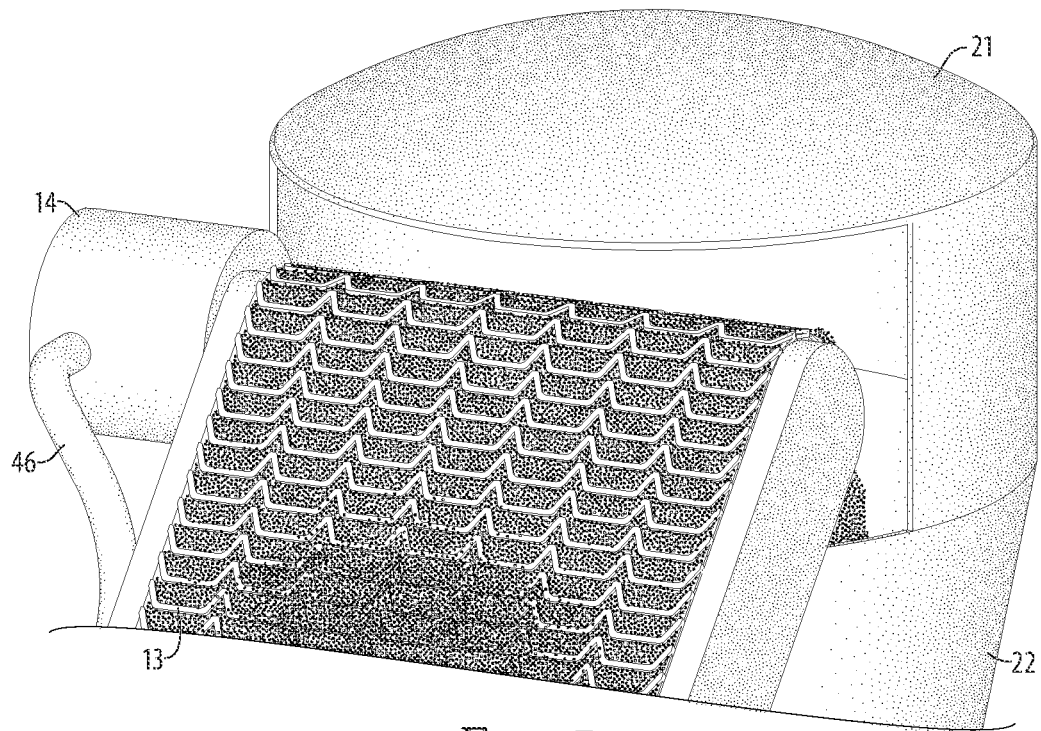
FIG. 7 is a detail view of the top of the conveyor subsystem of the dry granular material transfer system of the invention in use.

Referring to FIG. 6 and FIG. 7, the conveyor belt 13 provides segments which have a pattern of raised ridges connected together to form a continuous ridge along each segment, forming wells or pockets along each segment. In use, when sand is placed on the conveyor belt 13 and that sand is moved upward at a sufficiently steep angle, grains or clumps of sand extending above the raised ridges will slide downward, leaving in place the grains of sand contained within the wells of the conveyor belt 13. The downward-moving grains will either be caught by the next lower well or keep tumbling downward until caught. Clumps of sand moving downward in a tumbling motion will tend to break up, with the grains being caught by a lower well.

The conveyor belt 13 provides segments which in the illustrated embodiment measure 1 inch by 18 inches and which have a pattern of raised ridges connected together to form a continuous ridge along the 18-inch length of the segment. The ridges are raised ⅛" above the surface of the conveyor belt 13, and form seven wells or pockets along each segment to accommodate sand. The combined volume of the wells or pockets in this embodiment is approximately 1.6 cubic inches per segment. Each revolution of the conveyor motor 14 moves 16 segments, and therefore ejects approximately 25.6 cubic inches of sand into the containment cover 21.

Figure 8:
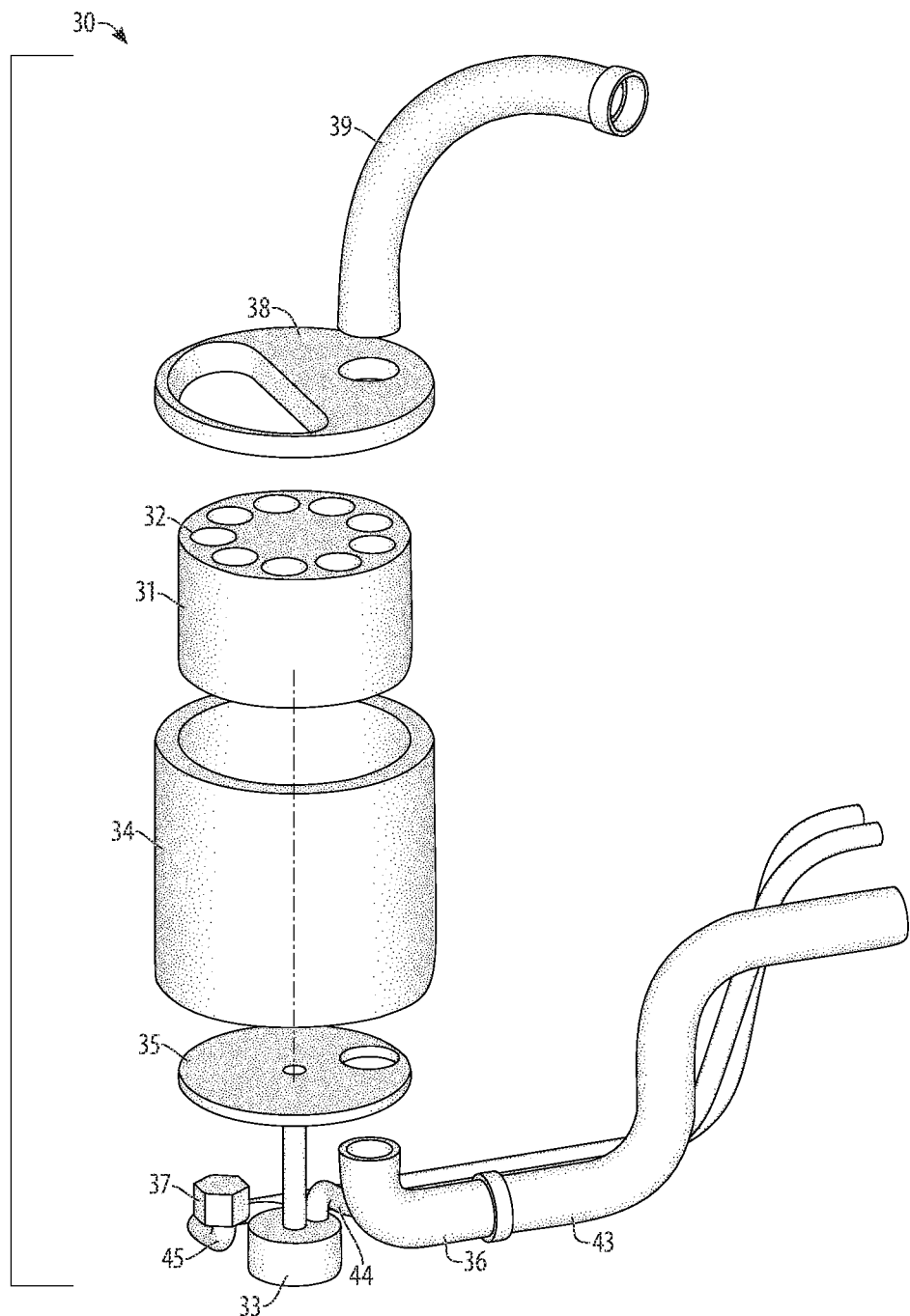
FIG. 8 is an exploded view of the portioning subsystem of the dry granular material transfer system of the invention.
Figure 9:
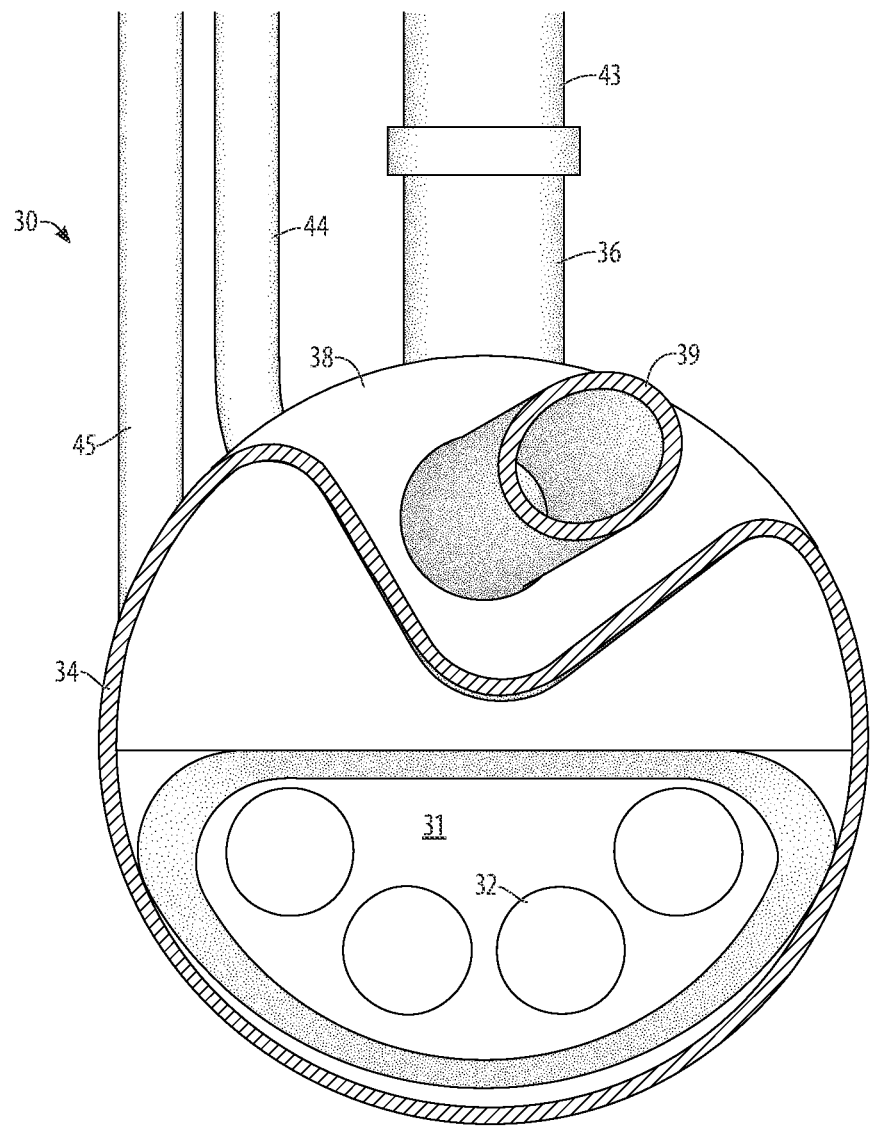
FIG. 9 is a section view of the portioning subsystem of the dry granular material transfer system of the invention.
Figure 10:
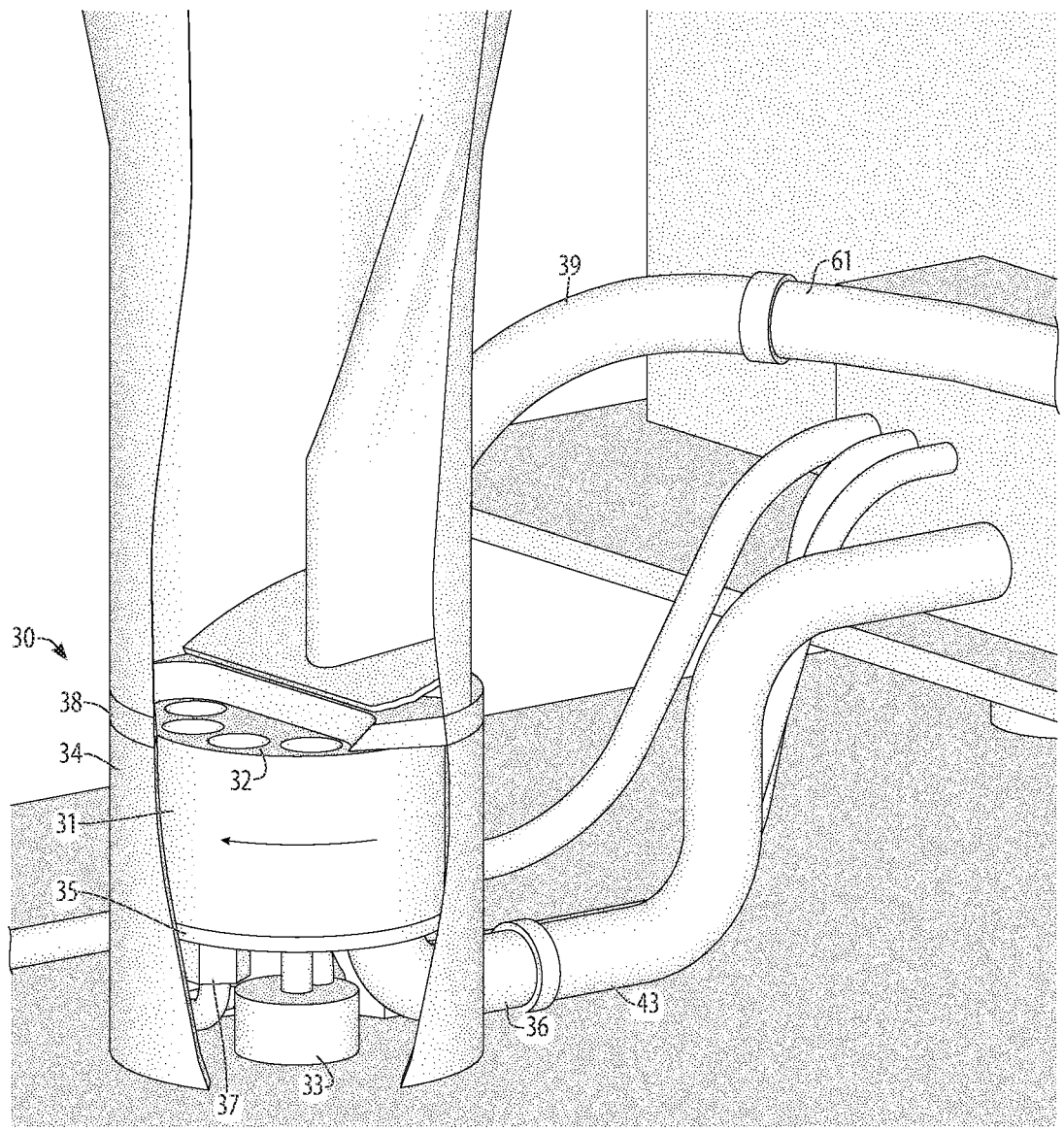
FIG. 10 is a cutaway view of the portioning subsystem of the dry granular material transfer system of the invention.

Referring to FIG. 8, FIG. 9, and FIG. 10, the portioning subsystem 30 provides a turntable 31 having cylindrical blow-through chambers 32 arrayed radially. The blow-through chambers 32 are open at the top and bottom of the turntable. Each blow-through chamber has a diameter substantially matching the inside diameter of the air-material outflow tube 39 and the transfer hose 61, which in the illustrated embodiment is a 2-inch diameter. The length of the blow-through chambers 32 in the illustrated embodiment is 6 inches, and therefore the volume of each chamber is 18.8 cubic inches of sand. The illustrated embodiment has 9 blow-through chambers 32 set at 40 degrees on a 3.5" radius, and one circuit of the turntable provides 169.2 cubic inches of sand. The turntable 31 is turned by a turning motor 33 which in a preferred embodiment is a pneumatic air motor which is supplied with pressurized air through a turning-motor supply 44.

The turntable 31 rotates within a sealing case 34. A sealing bottom plate 35 supports the turntable 31, with an air inflow tube 36 passing through the sealing bottom plate 35. A sealing top plate 38 seals the sealing case 34 above the turntable, with an air-material outflow tube 39 passing through the sealing top plate 38. The air inflow tube 36 and the air-material outflow tube 39 are in line with each other and are intended to blow the sand from blow-through chambers 32 passing through the area between the air inflow tube 36 and the air-material outflow tube 39. Sand will be blown from the blow-through chambers if any part of the chamber is in the path of the air, even if the chamber is not at a point of total alignment.

In a preferred embodiment, optionally, a vibrator motor 37 provides a vibrating or shaking motion to the turntable 31 and surrounding structures to ensure the smooth flow of sand and to prevent sand from sticking to itself or to the structures. In a preferred embodiment the vibrator motor 37 is a pneumatic air motor which is supplied with pressurized air through a vibrator-motor supply 45.

Figure 11:
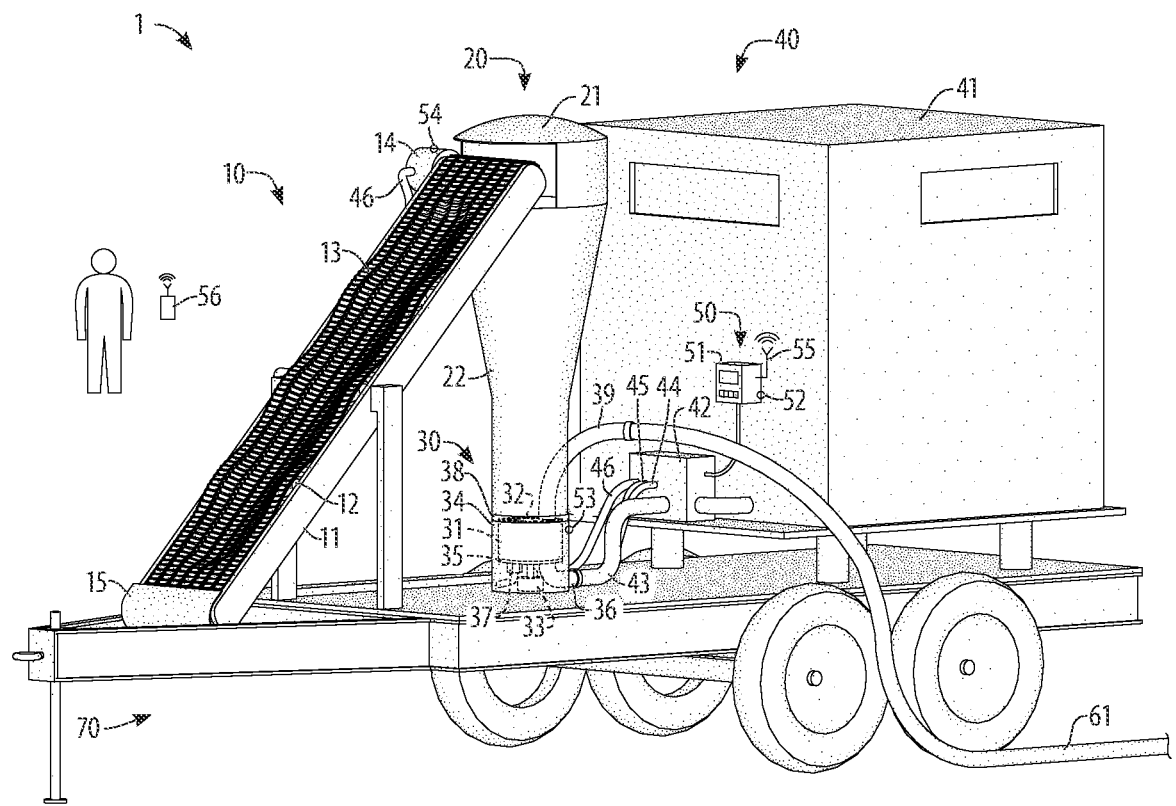
FIG. 11 is a perspective view of an embodiment of the dry granular material transfer system of the invention having remote control.

Referring to FIG. 11, the control subsystem 50 and the controller unit 51 provide for activation, deactivation, and operation of the dry granular material transfer system 1. The controller unit 51 provides for a user to start and stop the system, to set operating parameters, and to obtain information about the operations, such as amount of sand moved through the system. The controller unit 51 has means for display and for user input. A sensor receiver 52 receives data from a turntable sensor 53 which corresponds to output from the system, and data from a conveyor sensor 54 which corresponds to intake of sand, and the controller unit 51 can adjust the rates of intake and output as needed, and can store and report such data for purposes such as billing for, auditing, or troubleshooting use of the dry granular material transfer system 1. The controller unit 51 can be set to increase or decrease the rotational speeds of the conveyor motor 14 or the turning motor 33, or to adjust the pressure at the air inflow tube 36 where such adjustments are needed for specific granular materials or specific environmental conditions or specific transfer and distribution needs.

In a remote-control embodiment, the control subsystem 50 and controller unit 51 further provide a control communications link 55 which provides communication with one or more remote-control units 56. The control communications link can be a wireless radio-frequency communications unit, and can operate under a standard protocol such as WIFI or BLUETOOTH, or can operate with less range over an optical link such as an infrared link or a wired link. The remote-control unit 56 can be a purpose-built unit or can be implemented on a standard communications device such as a smartphone, tablet, or laptop computer. Through the remote-control unit 56 the user can control the operation of the dry granular material transfer system 1 and can obtain, save, and forward data and reports about the operation of the system.

Many other changes and modifications can be made in the system and method of the present invention without departing from the spirit thereof. I therefore pray that my rights to the present invention be limited only by the scope of the appended claims.

I claim:

1. A dry granular material transfer system comprising:
   (i) a base platform;

(ii) a conveyor subsystem mounted upon said base platform, having an angular orientation from low to high, adapted to move granular material placed on a lower portion to a higher portion, while separating clumped material and allowing rocks and debris to fall away, and to spread the granular material in a thin layer for ejection at the highest level;

(iii) a containment subsystem mounted upon said base platform, adapted to receive and contain the granular material ejected from said conveyor subsystem;

(iv) a portioning subsystem mounted upon said base platform, having a turntable with a plurality of blow-through chambers, and having an air inflow tube and air-material outflow tube, adapted to receive the granular material from said containment subsystem into said blow-through chambers and to rotate said blow-through chambers into alignment with said air inflow tube and air-material outflow tube, to blow the granular material through said blow-through chambers, said air-material outflow tube, and an attached transfer hose;

(v) an air subsystem adapted to supply compressed air; and (vi) a control subsystem adapted to control operation of said conveyor subsystem, said portioning subsystem, and said air subsystem.

2. The dry granular material transfer system of claim 1, where said conveyor subsystem further comprises a conveyor frame, conveyor rollers, conveyor belt, and conveyor motor.

3. The dry granular material transfer system of claim 1, where said conveyor subsystem further comprises a conveyor lower cover.

4. The dry granular material transfer system of claim 1, where said conveyor subsystem has an angular orientation from low to high of 45 degrees.

5. The dry granular material transfer system of claim 1, where said containment subsystem further comprises a containment cover and containment funnel.

6. The dry granular material transfer system of claim 1, where said portioning subsystem further comprises a turning motor, a sealing case, a sealing bottom plate, and a sealing top plate.

7. The dry granular material transfer system of claim 1, where said portioning subsystem further comprises a vibrator motor adapted to provide a vibrating motion to said turntable.

8. The dry granular material transfer system of claim 1, where said portioning subsystem further comprises a pneumatic vibrator motor and said air subsystem further comprises a vibrator-motor supply.

9. The dry granular material transfer system of claim 1, where said air subsystem further comprises an air pressure supplier and air pressure distributor.

10. The dry granular material transfer system of claim 1, where said air subsystem further comprises an inflow air supply.

11. The dry granular material transfer system of claim 1, where said conveyor subsystem further comprises a pneumatic conveyor motor and said air subsystem further comprises a conveyor-motor supply.

12. The dry granular material transfer system of claim 1, where said portioning subsystem further comprises a pneumatic turning motor and said air subsystem further comprises a turning-motor supply.

13. The dry granular material transfer system of claim 1, where said control subsystem further comprises a controller unit.

14. The dry granular material transfer system of claim 1, where said control subsystem further comprises a sensor receiver, a turntable sensor, and a conveyor sensor.

15. The dry granular material transfer system of claim 1, where said control subsystem further comprises a control communications link and a remote-control unit.

16. The dry granular material transfer system of claim 1, where said control subsystem further comprises a control communications link implemented over a wireless radio-frequency link.

17. The dry granular material transfer system of claim 1, where said control subsystem further comprises a remote-control unit implemented on a standard communications device.

18. The dry granular material transfer system of claim 1, where said base platform is a trailer.

19. A dry granular material transfer method comprising:
(i) providing a dry granular material transfer system comprising:
  (a) a base platform;
  (b) a conveyor subsystem mounted upon said base platform, having an angular orientation from low to high, adapted to move granular material placed on a lower portion to a higher portion, while separating clumped material and allowing rocks and debris to fall away, and to spread the granular material in a thin layer for ejection at the highest level;
  (c) a containment subsystem mounted upon said base platform, adapted to receive and contain the granular material ejected from said conveyor subsystem;
  (d) a portioning subsystem mounted upon said base platform, having a turntable with a plurality of blow-through chambers, and having an air inflow tube and air-material outflow tube, adapted to receive the granular material from said containment subsystem into said blow-through chambers and to rotate said blow-through chambers into alignment with said air inflow tube and air-material outflow tube, to blow the granular material through said blow-through chambers, said air-material outflow tube, and an attached transfer hose;
  (e) an air subsystem adapted to supply compressed air; and
  (f) a control subsystem adapted to control operation of said conveyor subsystem, said portioning subsystem, and said air subsystem;
(ii) activating said dry granular material transfer system;
(iii) supplying the granular material on the lower portion of said conveyor subsystem; and
(iv) transferring and distributing the granular material through said transfer hose.

* * * * *